United States Patent
Shen et al.

(10) Patent No.: US 9,426,747 B2
(45) Date of Patent: Aug. 23, 2016

(54) HANDS-OFF DETECTION AND DEACTIVATION FOR HANDHELD USER DEVICES

(71) Applicant: QUALCOMM Incorporated, San Diego, CA (US)

(72) Inventors: Jian Shen, San Diego, CA (US); Tongzeng Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 245 days.

(21) Appl. No.: 13/797,757

(22) Filed: Mar. 12, 2013

(65) Prior Publication Data
US 2014/0274222 A1   Sep. 18, 2014

(51) Int. Cl.
| | |
|---|---|
| H04W 52/02 | (2009.01) |
| G06F 1/16 | (2006.01) |
| G06F 1/32 | (2006.01) |
| G10L 25/78 | (2013.01) |

(52) U.S. Cl.
CPC ......... *H04W 52/0254* (2013.01); *G06F 1/1684* (2013.01); *G06F 1/3209* (2013.01); *G06F 1/3231* (2013.01); *H04W 52/028* (2013.01); *G06F 2200/1636* (2013.01); *G10L 2025/786* (2013.01); *H04M 2250/12* (2013.01); *H04M 2250/22* (2013.01); *Y02B 60/1289* (2013.01)

(58) Field of Classification Search
CPC ........... H04W 52/0254; H04W 52/028; G06F 1/3231; G06F 1/1684; G06F 1/3209; G06F 2200/1636; H04M 2250/22; G10L 2025/786; Y02B 60/1289

USPC ...... 455/574, 550.1, 410–411, 418
See application file for complete search history.

(56) References Cited

U.S. PATENT DOCUMENTS

| | | | |
|---|---|---|---|
| 2005/0064902 A1* | 3/2005 | Goris et al. | 455/556.1 |
| 2007/0211654 A1* | 9/2007 | Kim | H04W 52/0225 370/318 |
| 2009/0195959 A1 | 8/2009 | Ladouceur et al. | |
| 2010/0042827 A1* | 2/2010 | Pratt et al. | 713/100 |
| 2010/0138680 A1 | 6/2010 | Brisebois et al. | |
| 2010/0167792 A1 | 7/2010 | Chen et al. | |
| 2010/0187023 A1 | 7/2010 | Min | |
| 2010/0235666 A1* | 9/2010 | Fan et al. | 713/323 |
| 2013/0324196 A1* | 12/2013 | Wang et al. | 455/574 |

FOREIGN PATENT DOCUMENTS

| | | |
|---|---|---|
| EP | 2085866 A1 | 8/2009 |
| WO | 2012053941 A2 | 4/2012 |

OTHER PUBLICATIONS

International Search Report and Written Opinion—PCT/US2014/020849—ISA/EPO—May 30, 2014.

* cited by examiner

*Primary Examiner* — Marcos Torres
(74) *Attorney, Agent, or Firm* — Arent Fox LLP

(57) ABSTRACT

A user device having an active application periodically detects for a hands-off state of the user device. Upon detecting a hands-off state, the user device affects at least one of the active application and the user device. Prior to affecting at least one of the active application and the user device, the user device detects for one or more of a connection between the user device and another device, and an application of pressure to the user device. If either is detected the, the user device bypasses affecting at least one of the active application and the user device.

24 Claims, 4 Drawing Sheets

HANDS-OFF DETECTION AND DEACTIVATION FOR HANDHELD USER DEVICES

BACKGROUND

1. Field

The present disclosure relates generally to handheld user devices, and more particularly to hands-off detection and deactivation for handheld user devices.

2. Background

In addition to call quality, the battery life of a mobile user device is one of the most important considerations when choosing a handset. Modern day mobile devices have a breadth of applications and capabilities which all take a toll on the battery life of the device. Furthermore, a user is often unable to connect the mobile device to a power source for charging. Therefore, maximizing the lifespan of a mobile device's battery between charges is of critical importance.

Battery life between charges can be extended by putting the device into sleep mode while the user is not using the device. Sleep mode refers to a low power mode for electronic devices that can save significant power consumption compared to leaving the device fully on. When the user resumes use of the device, the device does not need to be restarted and may resume normal operation with any user input such as an arbitrary button push or physical movement of the device.

It is a challenge to accurately and intelligently detect when a user is not using the device, and therefore when to go into sleep mode. For example, when a user is listening to music or watching a video program, the mobile device should accurately determine whether or not the user is using the device and therefore whether or not to enter into sleep mode. Some current solutions include manually pressing the power button, a fixed or adaptive timer to dim the screen or pause the music or video player, or using a built-in camera to track the user's gaze under proper lighting conditions.

SUMMARY

In an aspect of the disclosure, a method, a computer program product, and an apparatus are provided. An apparatus, e.g. a user device, having an active application periodically detects for a hands-off state of the user device. Upon detecting a hands-off state, the user device affects at least one of the active application and the user device. Prior to affecting at least one of the active application and the user device, the user device detects for one or more of a connection between the user device and another device, and an application of pressure to the user device. If either is detected, the user device bypasses affecting at least one of the active application and the user device

DETAILED DESCRIPTION

Figure 1:
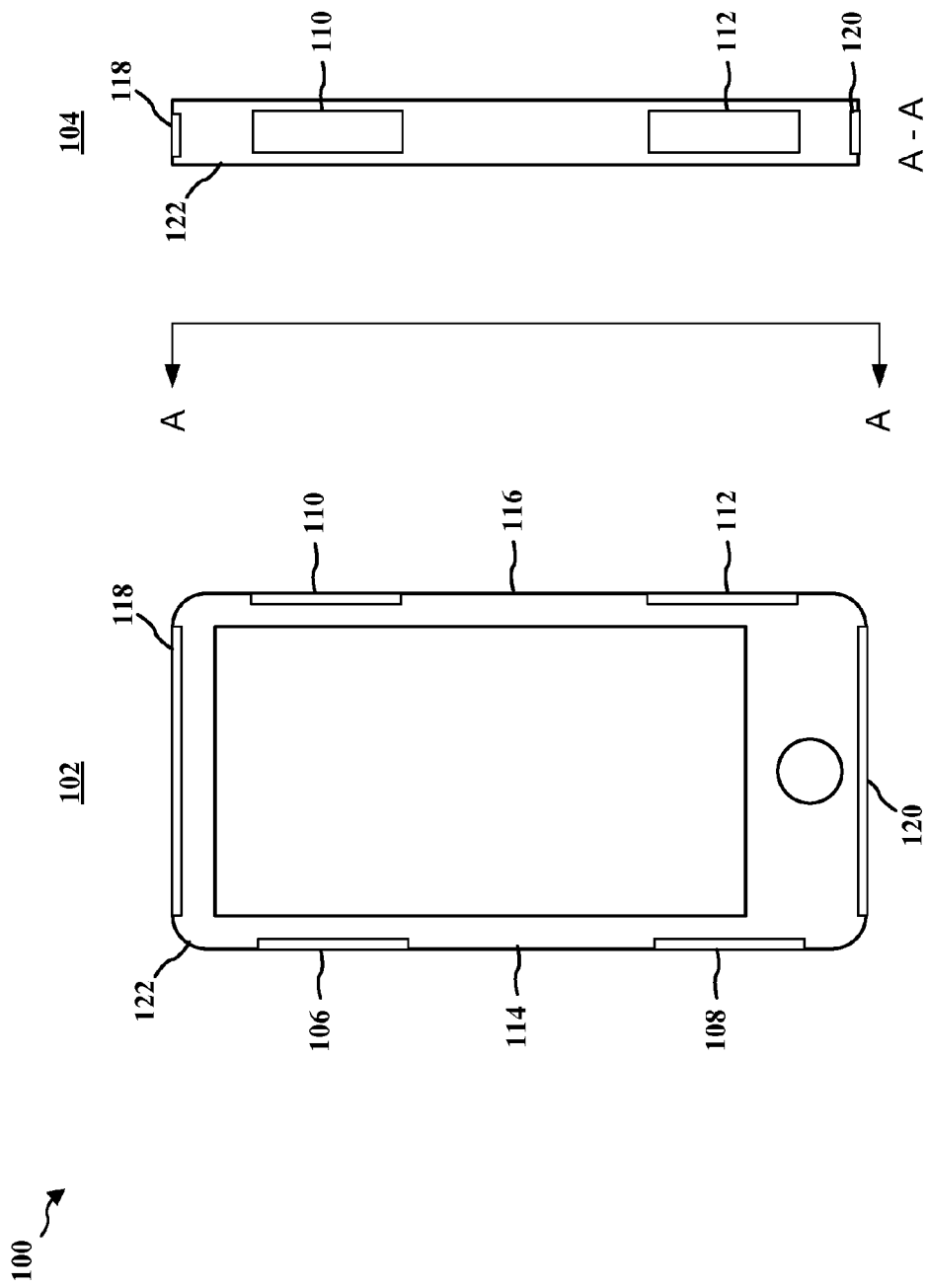
FIG. 1 is a diagram illustrating front and side views of a user device with touch sensors.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a user device with hands-off detection and deactivation will now be presented with reference to various apparatuses and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

As described above, sleep mode is a low power mode for electronic devices that can save power consumption compared to leaving the device in a normal state of operation. Determining when an electronic device, particularly a mobile device, should enter sleep mode is crucial for conserving battery life. Embodiments described herein generally relate to determining when a user device should enter sleep mode by detecting touch on the user device. In one embodiment, sensors may be mounted on at least two sides or edges of the user device to detect touch. Examples of sensors include, but are not limited to, squeeze sensors, capacitive touch sensors, piezoelectric sensors, or temperature gradient sensors. When a touch is detected on at least two edges, the user device is in a "hands-on" state. Conversely, when no touch is detected on at least two edges, the user device is in a "hands-off" state.

FIG. 1 is an illustration of a handheld user device 100 with touch sensors in a front view 102 and a side view 104. The user device 100 may be, but is not limited to a mobile device. The user device 100 includes a housing 122 having a first lateral side 114 or edge opposite a second lateral side 116 or edge and top side 118 or edge opposite a bottom side 120 or edge. The first lateral side 114 and the second lateral side 116 are adjacent to or neighbor both the top side 118 and the bottom side 120.

A first pair of side sensors 106, 108 is located on the first lateral side 114, opposite a second pair of side sensors 110, 112, on the second lateral side 116. A top sensor 118 is located on the top side opposite a bottom sensor 120 located on the bottom side. Additional top sensors may be included. The sensors 106, 108, 118, 120 are placed along the edges at locations that generally corresponds to user hand and finger placement.

As described above, the sensors mounted on the edges of the user device 100 may include, but are not limited to squeeze sensors, capacitive touch sensors, piezoelectric sensors, or temperature gradient sensors which are capable of detecting a user's touch. When a touch is detected on at least two edge sensors, the user device 100 is in a hands-on state and when a touch is not detected the user device 100 is in a hands-off state.

Figure 2:
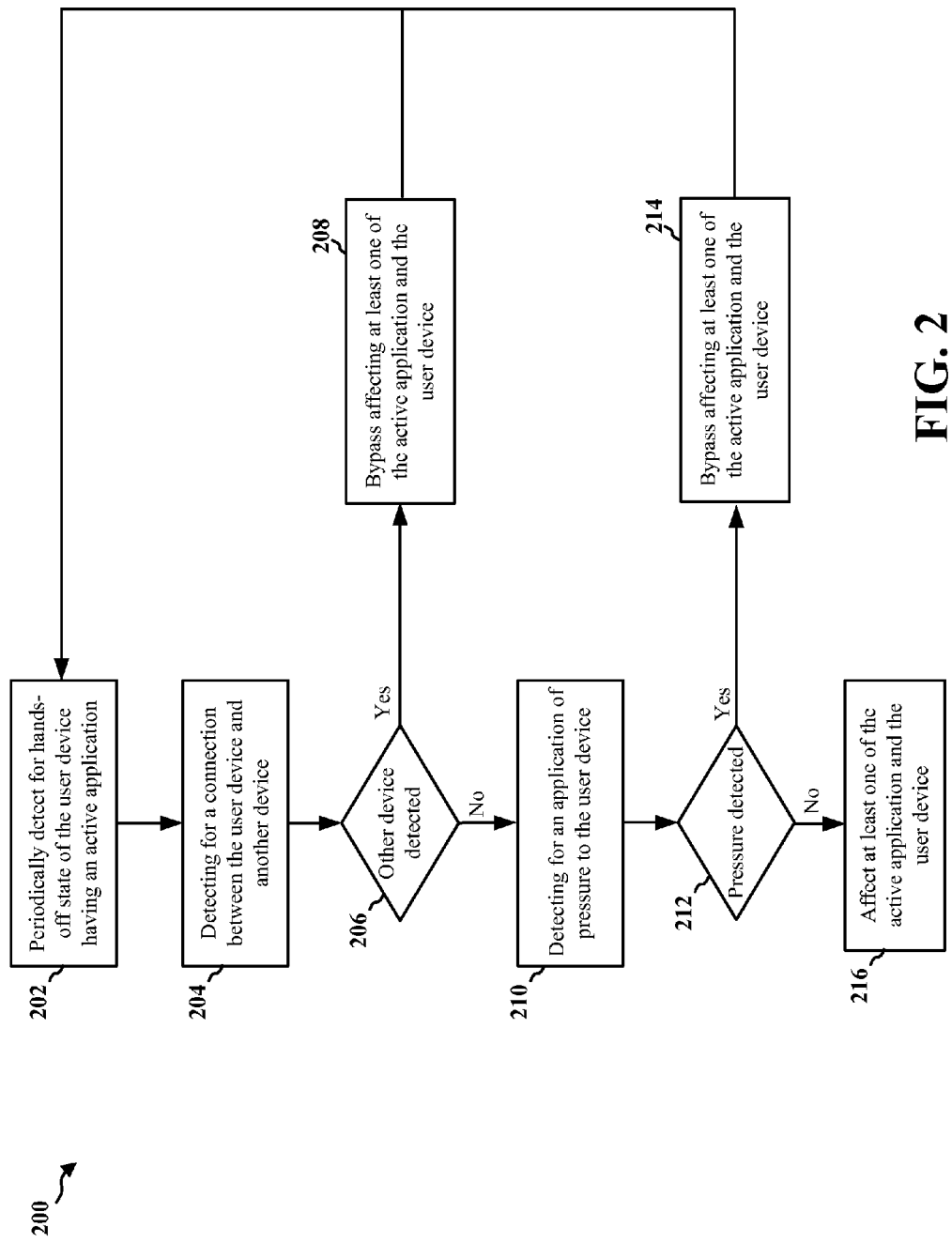
FIG. 2 is a flow chart of a method of hands-off detection and deactivation for a user device.

FIG. 2 is a flow chart 200 of a method of hands-off detection and deactivation for a user device. The method provides for deactivation of a user device upon detection of a hands-off state. Deactivation may include one or more of: reducing an output of the user device, deactivating an active application on the user device, and powering down the user device. The method also provides for bypassing of deactivation in certain instances. The method may be performed by a user device, such as a smart phone, having an active application. Since the user device has an active application, it is assumed that the user device is currently in a hands-on state; and the method begins accordingly.

At step 202, the user device periodically detects for a hands-off state of the user device having an active application. To this end, the user device detects for an absence of touch along a plurality of edges of the housing of the user device. For example, the user device may periodically read data from touch sensors, such as those located and described above with reference to FIG. 1, at fixed or variable intervals of time. In one configuration, the user device detects for an absence of touch on at least two edges corresponding to one of neighboring edges or opposite edges of the user device housing. A hands-off state may be detected by processing sensor data received from sensors to determine whether no touch is present at each of a pair of opposite sensors, e.g., a first-lateral-side sensor and a second-lateral-side sensor, or no touch is present at each of a pair of neighboring or adjacent sensors, e.g., a top-side sensor and a first-lateral-side sensor.

As noted above, sensors that may be used include piezoelectric sensors, capacitive sensors, or temperature gradient sensors. Piezoelectric sensors use a piezoelectric effect to measure pressure by converting it to an electric charge. When the user applies pressure on at least two sides of the user device, the piezoelectric sensors may induce a positive reading which may indicate a user is holding the device. Other sensors may include capacitive sensors which may read the human body capacitance as an input to determine a user is holding the device. A temperature gradient sensor may also be used, which registers a change in temperature such as when a user is holding the device. A hands-off state may be defined as not detecting a signal from any two of the sensors described above.

If a hand-off state is detected at step 202, the process proceeds to step 204, where the user device detects for a connection between the user device and another device. For example, the user device may detect for a wired connection by detecting for the presence of a physical connection between the user device and another structure, such as a USB cable or a docketing station. The user device may also detect for a wireless connection by detecting for an active wireless port, such as a Bluetooth connection. If a hand-off state is not detected at the 202, the process remains at step 202 where the user device continues to periodically detect for a hands-off state of the user device.

At step 206, if an external device is connected to the user device, the user device bypasses deactivation by bypassing affecting at least one of the active application and the user device. In other words, the user device is not put into sleep mode, is not powered down, nor is an active application deactivated, if an external device is connected.

At step 206, if no connection to an external device is detected by the user device, the method 200 proceeds to step 210, where the user device detects for an application of pressure to the user device through the touch sensors. The application of pressure to the user device may be a predefined sequence of spaced-apart pressure applications that allows the user to initiate a bypass of the deactivation of the user device. For example, the user may setup the user device to recognize a user-defined sequence of squeezes or touches. If the user device comprises piezoelectric sensors, the user-defined sequence may comprise a sequence of squeezes on two or more sensors mounted on the device, where at least one sensor is on a different side of the user device than another sensor. For other types of sensors mounted on the user device, other types of sequences may also be defined that are pertinent to the type of sensor. If the user device comprises temperature gradient sensors, the user-defined sequence may comprise a sequence of finger taps on one or more sensors to resume normal operation of the user device.

At step 212, if an application of pressure is detected, the process proceeds to step 214, where the user device bypasses affecting at least one of the active application and the user device. In other words, the user device is not put into sleep mode, is not powered down, nor is an active application deactivated, if an application of pressure is detected.

Returning to step 212, if an application of pressure is not detected, the process proceeds to step 216, where the user device affects at least one of the active application or the user device. Affecting at least one of the active application or the user device may comprise shutting down the active application, dimming the display, lowering the audio, entering sleep mode or a low-power mode, or shutting down the user device.

Figure 3:
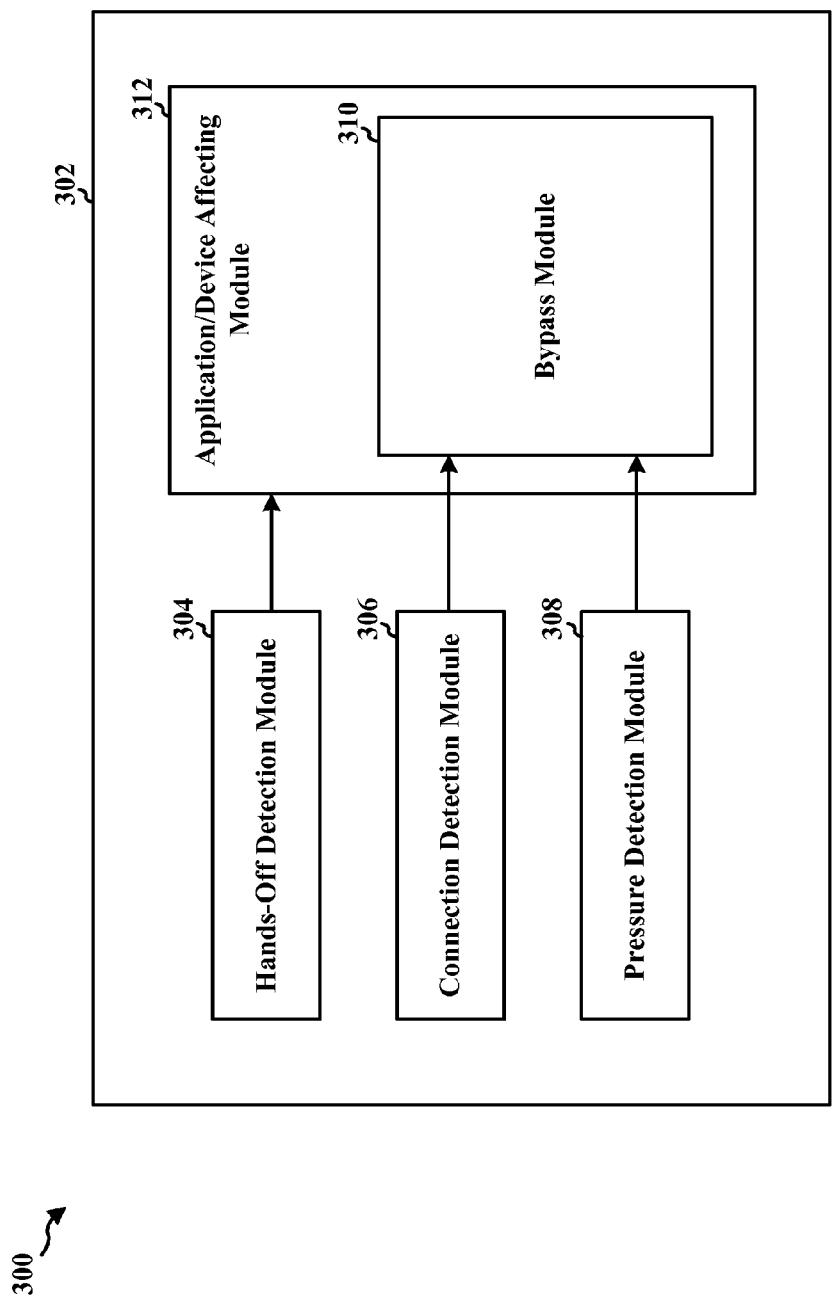
FIG. 3 is a block diagram illustrating the modules/means/components of a user device that implements the method of FIG. 2.

FIG. 3 is a block diagram 300 illustrating the modules/means/components of a user device 302 with hands-off detection and deactivation. The apparatus includes a hands-off detection module 304 that periodically detects for a hands-off state of the user device having an active application. The hands-off detection module 304 may include the touch sensors described above and the processing capability to determine the presence or absence of touch and hands-on and hand-off states. The user device 302 also includes an application/device affecting module 306 that affects at least one of the active application and the user device upon detecting a hands-off state. This module 306 includes the processing capability to, for example, shut down an active application, dim the display, lower the audio output, enter sleep mode or a low-power mode, or shut down the user device.

The user device 302 also includes modules that function to bypass operation of the application/device affecting module 306. These modules include a connection detection module 308 that detects for a connection between the user device and another device, a pressure application detection module 310 that detects for an application of pressure to the user device, and a bypass module 312 that bypasses affecting at least one of the active application and the user device. The bypass module 312 includes the processing capability to cause the application/device affecting module 306 to refrain from modifying operation of the user device 302. In other words, the bypass module 312 prevents the application/device affecting module 306 from reducing an output of the user device, deactivating the active application, or powering down the user device.

The apparatus may include additional modules that perform each of the steps of the algorithm in the aforementioned flow chart of FIG. 2. As such, each step in the aforementioned flow chart of FIG. 2 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 4:
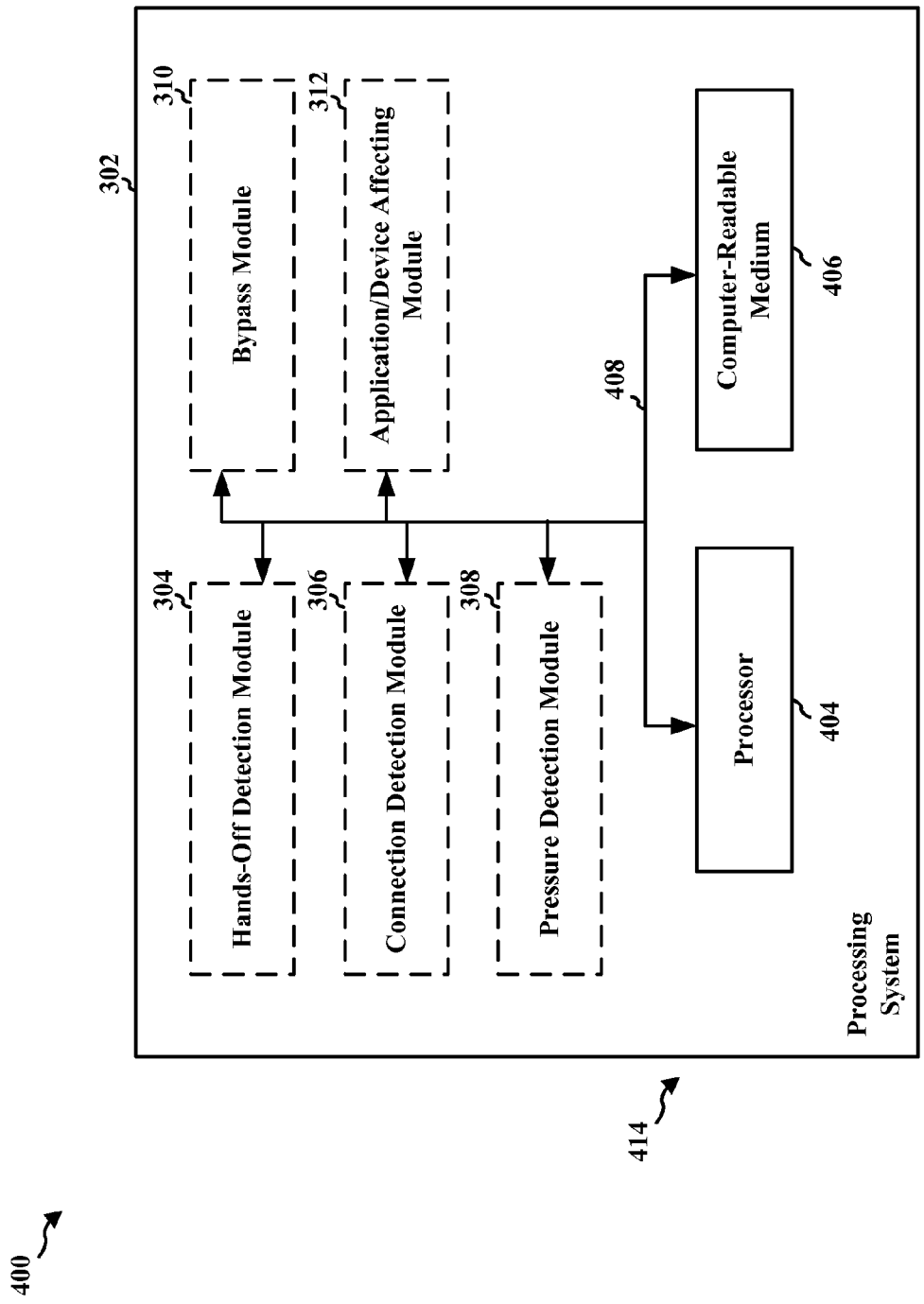
FIG. 4 is a diagram illustrating a hardware implementation for a user device employing a processing system to implement the method of FIG. 2.

FIG. 4 is a diagram 400 illustrating an example of a hardware implementation for a user device 302 employing a processing system 414. The processing system 414 may be implemented with a bus architecture, represented generally by the bus 408. The bus 408 may include any number of interconnecting buses and bridges depending on the specific application of the processing system 414 and the overall design constraints. The bus 408 links together various circuits including one or more processors and/or hardware modules, represented by the processor 404, the modules 304, 306, 308 and 312 and the computer-readable medium 406. The bus 408 may also link various other circuits such as timing sources, peripherals, voltage regulators, and power management circuits, which are well known in the art, and therefore, will not be described any further.

The processing system 414 includes a processor 404 coupled to a computer-readable medium 406. The processor 404 is responsible for general processing, including the execution of software stored on the computer-readable medium 406. The software, when executed by the processor 404, causes the processing system 414 to perform the various functions described supra for any particular apparatus. The computer-readable medium 406 may also be used for storing data that is manipulated by the processor 404 when executing software. The processing system further includes at least one of the modules 304, 306, 308 and 312. The modules may be software modules running in the processor 404, resident/stored in the computer readable medium 406, one or more hardware modules coupled to the processor 404, or some combination thereof.

In one configuration, the user device 302 includes means for periodically detecting for a hands-off state of the user device having an active application, and means for affecting at least one of the active application and the user device upon detecting a hands-off state. The user device also includes means for detecting for a connection between the user device and another device prior to affecting at least one of the active application and the user device, and means for bypassing affecting at least one of the active application and the user device if a connection is detected.

The user device further includes means for detecting for an application of pressure to the user device prior to affecting at least one of the active application and the user device, and means for bypassing affecting at least one of the active application and the user device if an application of pressure to the user device is detected. The aforementioned means may be one or more of the aforementioned modules of the apparatus 302 and/or the processing system 414 of the apparatus configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of controlling a user device, comprising:
periodically detecting for a hands-off state of the user device having an active application;
detecting, based on detecting the hands-off state of the user device, whether there is an absence of a connection between the user device and another device;
detecting, based on detecting the absence of the connection between the user device and another device, whether there is an absence of an application of pressure to the user device; and
transitioning the user device to a low-power mode, based on detecting the hands-off state of the user device, based on detecting the absence of the connection between the user device and another device, and based on detecting the absence of the application of pressure to the user device.

2. The method of claim 1, wherein the application of pressure to the user device comprises a predefined sequence of spaced-apart pressure applications.

3. The method of claim 1, wherein periodically detecting for a hands-off state of the user device comprises detecting for an absence of touch along a plurality of edges of a housing of the user device.

4. The method of claim 3, wherein the plurality of edges of a housing comprise at least two edges corresponding to one of neighboring edges or opposite edges.

5. The method of claim 1, wherein the periodicity between detecting for a hands-off state is adaptive.

6. The method of claim 1, wherein transitioning the user device to a low-power mode comprises one or more of: reducing an output of the user device, deactivating the active application, and powering down the user device.

7. A user device, comprising:
   means for periodically detecting for a hands-off state of the user device having an active application;
   means for detecting based on detecting the hands-off state of the user device, whether there is an absence of a connection between the user device and another device;
   means for detecting, based on detecting the absence of the connection between the user device and another device, whether there is an absence of an application of pressure to the user device; and
   means for transitioning the user device to a low-power mode, based on detecting the hands-off state of the user device, based on detecting the absence of the connection between the user device and another device, and based on detecting the absence of the application of pressure to the user device.

8. The user device of claim 7, wherein the application of pressure to the user device comprises a predefined sequence of spaced-apart pressure applications.

9. The user device of claim 7, wherein the means for periodically detecting for a hands-off state of the user device is configured to detect for an absence of touch along a plurality of edges of a housing of the user device.

10. The user device of claim 9, wherein the plurality of edges of a housing comprise at least two edges corresponding to one of neighboring edges or opposite edges.

11. The user device of claim 7, wherein the means for transitioning the user device to a low-power mode is configured to reduce an output of the user device, deactivate the active application, and/or power down the user device.

12. A user device, comprising:
   a memory; and
   at least one processor coupled to the memory and configured to:
      periodically detect for a hands-off state of the user device having an active application;
      detect, based on the detection of the hands-off state of the user device, whether there is an absence of a connection between the user device and another device;
      detect, based on the detection of the absence of the connection between the user device and another device, whether there is an absence of an application of pressure to the user device; and
      transition the user device to a low-power mode, based on the detection of the hands-off state of the user device, based on the detection of the absence of the connection between the user device and another device, and based on the detection of the absence of the application of pressure to the user device.

13. The user device of claim 12, wherein the application of pressure to the user device comprises a predefined sequence of spaced-apart pressure applications.

14. The user device of claim 12, wherein the at least one processor periodically detects for a hands-off state of the user device by detecting for an absence of touch along a plurality of edges of a housing of the user device.

15. The user device of claim 14, wherein the plurality of edges of a housing comprise at least two edges corresponding to one of neighboring edges or opposite edges.

16. The user device of claim 12, wherein the at least one processor transitions the user device to a low-power mode by reducing an output of the user device, deactivating the active application, or powering down the user device.

17. A non-transitory computer-readable medium storing computer executable code for a user device, comprising code for:
   periodically detecting for a hands-off state of the user device having an active application;
   detecting, based on detecting the hands-off state of the user device, whether there is an absence of a connection between the user device and another device;
   detecting, based on detecting the absence of the connection between the user device and another device, whether there is an absence of an application of pressure to the user device; and
   transitioning the user device to a low-power mode based on detecting the hands-off state of the user device, based on detecting the absence of the connection between the user device and another device, and based on detecting the absence of the application of pressure to the user device.

18. The product of claim 17, wherein the application of pressure to the product comprises a predefined sequence of spaced-apart pressure applications.

19. The product of claim 17, wherein the code for periodically detecting for a hands-off state of the product comprises code for detecting for an absence of touch along a plurality of edges of a housing of the product.

20. The product of claim 19, wherein the plurality of edges of a housing comprise at least two edges corresponding to one of neighboring edges or opposite edges.

21. The product of claim 17, wherein the code for transitioning the user device to a low-power mode comprises code for reducing an output of the user device, deactivating the active application, and/or powering down the user device.

22. A handheld user device, comprising:
   a housing;
   a first touch sensor associated with a first side of the housing;
   a second touch sensor associated with a second side of the housing adjacent to or opposite the first side of the housing; and
   a processor configured to:
      run an active application;
      periodically detect for a hands-off state of the user device based on an absence of signals from the first touch sensor and the second touch sensor;
      detect, based on the detection of the hands-off state of the user device, whether there is an absence of a connection between the user device and another device;
      detect, based on the detection of the absence of the connection between the user device and another device, whether there is an absence of an application of pressure to the user device; and
      transition the user device to a low-power mode, based on the detection of the hands-off state of the user device, based on the detection of the absence of the connection between the user device and another device, and based on the detection of the absence of the application of pressure to the user device.

23. The handheld user device of claim 22, wherein the application of pressure to the user device comprises a predefined sequence of spaced-apart pressure applications.

24. The handheld user device of claim 22, wherein the processor transitions the user device to a low-power mode by reducing an output of the user device, deactivating the active application, or powering down the user device.

* * * * *